May 13, 1930.                J. C. SHELLER                1,758,337
                              LOCKING DEVICE
                             Filed Feb. 6, 1928

INVENTOR
J. C. SHELLER
BY
ATTORNEYS

Patented May 13, 1930

1,758,337

UNITED STATES PATENT OFFICE

JOHN C. SHELLER, OF MAYWOOD, ILLINOIS, ASSIGNOR TO WALTER B. HINTZE, OF CHICAGO, ILLINOIS

LOCKING DEVICE

Application filed February 6, 1928. Serial No. 252,241.

My invention relates to improvements in locking devices, and it consists in the combinations, constructions, and arrangements herein described and claimed.

An object of my invention is to provide a locking device by means of which two members may be automatically locked together when they are moved into closed positions.

A further object of my invention is to provide a locking device which is especially adapted for windows for automatically locking the windows together when in closed position, and to provide a novel means for rigidly holding the windows against lateral vibration.

A further object of my invention is to provide a device of the type described which may be readily used on doors, French windows, cabinet doors, and the like.

Other objects and advantages will appear in the following specification, and the novel features of the invention will be particularly pointed out in the appended claims.

Figure 1:
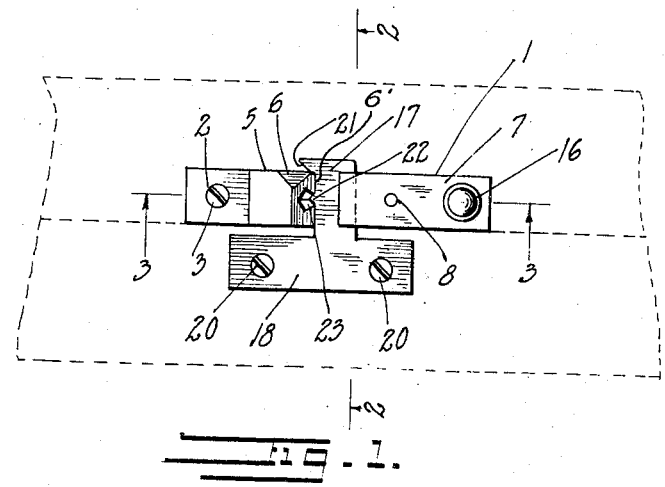
Figure 2:
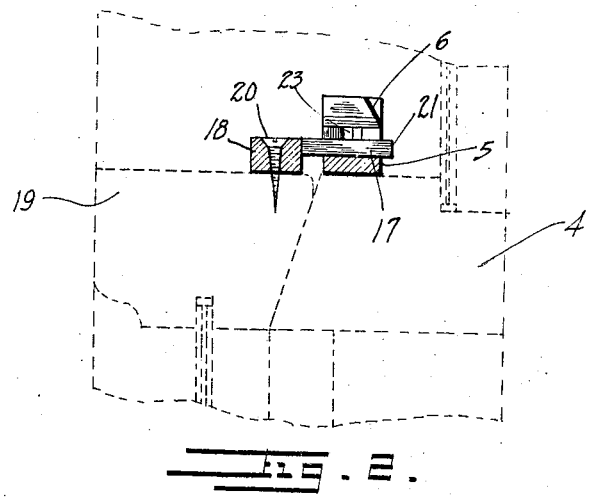
Figure 3:
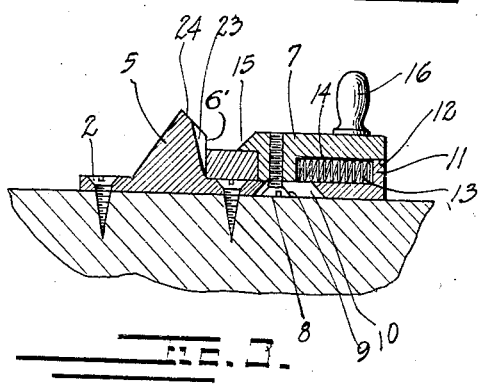

My invention is illustrated in the accompanying drawings, forming part of this application, in which Figure 1 is a top plan view of my device, Figure 2 is a section along the line 2—2 of Figure 1, and Figure 3 is a section along the line 3—3 of Figure 1.

In carrying out my invention, I provide a body member or frame 1 having openings 2 for receiving screws or the like 3, whereby the body member may be secured to a supporting member 4. The body member 1 is provided with a guide block or portion 5 which has a tapered cam surface 6 for a purpose hereinafter described. The guide block is also provided with an abutting surface 6'.

The body member is provided with a latch 7 which is movably secured thereto by a screw 8. The screw 8 is provided with a tapered head portion 9 which is slidably disposed in an elongated opening 10 in the body member. The walls of the opening 10 are tapered to conform to the angle of the tapered head portion 9 for holding the head portion and the latch against displacement. A tongue portion 11 is integral with the body member 1 and is receivable in a groove 12 of the latch 7. A compression spring 13 is disposed in a recess 14 in the latch and has one of its ends disposed adjacent the tongue portion 11. The other end of the compression spring abuts the latch 7, tending to move the latch away from the tongue portion 11. The latch 7 is provided with a retaining lip 15 and a handle 16.

A bar or projecting member 17 is integral with a frame 18 which is arranged to be secured to a movable member 19 by means of screws 20. The bar or projection 17 is provided with a tapered cam 21 which is arranged to engage with the cam surface 6. The bar or projection 17 is also provided with a V-shaped retaining lug 22 which is receivable in a V-shaped groove 23 provided in the block 5.

From the foregoing description of the various parts of the device, the operation thereof may be readily understood. It is obvious that the body member 1 together with its cooperating parts may be readily secured to any one of two members and the frame 18 with the bar 17 secured to the other of any two members which are adapted to be moved together, and which it is desirous of securing together. For illustration, let us assume that the body member 1 is secured to the upper window sash 4, which has been indicated as a supporting member, and that the frame 18 is secured to the lower window sash, which has been indicated as the movable member 19. The lower window 19 may be raised by the operator moving the latch 7 so as to cause the lip 15 to move free from the bar 17. This movement of the latch 7 is caused by gripping the handle 16 and forcing the latch against the tension of the spring 13 in the direction opposite the block 5. The head portion 9 of the screw 8 is allowed to move in the elongated opening 10 and holds the latch against displacement, due to the tapered wall thereof engaging with the tapered wall of the opening 10.

In lowering the movable member or the window 19, the bar 17 is guided into its locked position by several means, including the tapered surface 24 and the abutting surface 6' of the block 5 and the tapered lip 15. Furthermore, the cam 21 engages with the cam surface 6 and draws the two windows together to form a weather-tight connection therebetween and to prevent the windows from vibrating. During this movement of the windows toward each other, the V-shaped retaining lug 22 is guided into the V-shaped groove 23 which provides a positive means when the bar 17 is in its locked position for holding the windows rigid and close together.

As the bar 17 is moved into its locked position, it engages with the tapered surface of the lip 15, therefore forcing the lip 15 and the latch 7 away from the block 5 until the upper surface of the bar 17 passes beneath the lip and allows the lip to be forced by the spring 13 into locking engagement with the bar 17.

I claim:

1. A device of the type described comprising an elongated frame, a guide block integral with said frame and having an abutting surface extending at right angles with respect to said frame, said guide block having a tapered surface extending from the upper edge thereof to said abutting surface and being provided with a tapered groove extending from said tapered surface to said frame through said abutting surface, an arm, a retaining lug integral with said arm and receivable in said groove as said arm is passed over said tapered surface and into engagement with said abutting surface, and means for securing said arm in engagement with said abutting surface.

2. A device of the type described comprising an elongated frame, a guide block integral with said frame and having an abutting surface extending at right angles with respect to said frame, said guide block having a tapered surface extending from the upper edge thereof to said abutting surface and being provided with a tapered groove extending from said tapered surface to said frame through said abutting surface, an arm, a retaining lug integral with said arm and receivable in said groove as said arm is passed over said tapered surface and into engagement with said abutting surface, means for securing said arm in engagement with said abutting surface, said guide block being provided with a tapered cam surface extending outwardly from the upper edge thereof, and an outwardly extending lip integral with said arm arranged to engage with said cam surface for moving said arm laterally as said arm is moved into engagement with said abutting surface.

3. A device of the type described comprising an elongated frame, a guide block integral with said frame and having an abutting surface extending at right angles with respect to said frame, said guide block having a tapered surface extending from the upper edge thereof to said abutting surface and being provided with a tapered groove extending from said tapered surface to said frame through said abutting surface, an arm, a retaining lug integral with said arm and receivable in said groove as said arm is passed over said tapered surface and into engagement with said abutting surface, means for securing said arm in engagement with said abutting surface, said guide block being provided with a tapered cam surface extending outwardly from the upper edge thereof, an outwardly extending lip integral with said arm arranged to engage with said cam surface for moving said arm laterally as said arm is moved into engagement with said abutting surface, said securing means comprising a latch having a recess therein, a flange integral with said frame and receivable in the recess in said latch, and spring means disposed in said recess and in engagement with said flange for moving said latch toward said abutting surface.

4. A device of the type described comprising an elongated frame, a guide block integral with said frame and having an abutting surface extending at right angles with respect to said frame, said guide block having a tapered surface extending from the upper edge thereof to said abutting surface and being provided with a tapered groove extending from said tapered surface to said frame through said abutting surface, an arm, a retaining lug integral with said arm and receivable in said groove as said arm is passed over said tapered surface and into engagement with said abutting surface, means for securing said arm in engagement with said abutting surface, said guide block being provided with a tapered cam surface extending outwardly from the upper edge thereof, an outwardly extending lip integral with said arm arranged to engage with said cam surface for moving said arm laterally as said arm is moved into engagement with said abutting surface, said securing means comprising a latch having a recess therein, a flange integral with said frame and receivable in the recess in said latch, and spring means disposed in said recess and in engagement with said flange for moving said latch toward said abutting surface, said latch being provided with a recess arranged to receive said arm for holding said arm against displacement.

Signed at Chicago, in the county of Cook, and State of Illinois, this 3rd day of February, A. D. 1928.

JOHN C. SHELLER.